United States Patent
Boch et al.

(10) Patent No.: US 10,378,622 B2
(45) Date of Patent: Aug. 13, 2019

(54) ACTUATING DEVICE WITH DOUBLE SCREW CONNECTING MEANS

(71) Applicant: Aktiebolaget SKF, Gothenburg (SE)

(72) Inventors: Christian Boch, Chambery (FR); Jerome Dubus, Aix les Bains (FR)

(73) Assignee: Aktiebolaget SKF, Gothenburg (SE)

( * ) Notice: Subject to any disclaimer, the term of this patent is extended or adjusted under 35 U.S.C. 154(b) by 121 days.

(21) Appl. No.: 15/326,554

(22) PCT Filed: Jul. 18, 2014

(86) PCT No.: PCT/EP2014/065514
§ 371 (c)(1),
(2) Date: Jan. 16, 2017

(87) PCT Pub. No.: WO2016/008541
PCT Pub. Date: Jan. 21, 2016

(65) Prior Publication Data
US 2017/0211670 A1    Jul. 27, 2017

(51) Int. Cl.
| F16H 25/00 | (2006.01) |
| F16H 25/20 | (2006.01) |
| F16H 25/22 | (2006.01) |
| F16H 25/24 | (2006.01) |

(52) U.S. Cl.
CPC ..... F16H 25/2056 (2013.01); F16H 25/2015 (2013.01); F16H 25/2252 (2013.01); F16H 25/2454 (2013.01)

(58) Field of Classification Search
CPC ............. F16H 25/2056; F16H 25/2454; F16H 25/2015; F16H 25/2252
See application file for complete search history.

(56) References Cited

U.S. PATENT DOCUMENTS

| 2,800,804 | A | | 7/1957 | Olschwang | |
| 3,214,991 | A | * | 11/1965 | Perrin | B23Q 5/40 74/424.92 |
| 4,964,314 | A | * | 10/1990 | Wilkes | F16H 25/2252 74/424.92 |
| 6,318,516 | B1 | * | 11/2001 | Zernickel | B60T 13/741 188/157 |
| 7,044,012 | B2 | * | 5/2006 | Dubus | F16H 25/2252 74/89.35 |
| 8,312,784 | B2 | * | 11/2012 | Bonny | F16H 25/2252 384/550 |

FOREIGN PATENT DOCUMENTS

| DE | 480327 C | 8/1929 |
| EP | 1359345 A2 | 11/2003 |
| EP | 2112402 A1 | 10/2009 |
| JP | 2003214518 A | 7/2003 |

* cited by examiner

*Primary Examiner* — Victor L Macarthur
(74) *Attorney, Agent, or Firm* — Laurence A. Greenberg; Werner H. Stemer; Ralph E. Locher

(57) ABSTRACT

An actuating device having a longitudinal shaft, an internal sleeve, an external sleeve, internal screw connecting means provided between the longitudinal shaft and the intermediate sleeve, external screw connecting means provided between the intermediate sleeve and the external sleeve. The direct efficiency of the internal screw connecting means is higher than the direct efficiency of the external screw connecting means. The self-releasable coupling means are provided between the longitudinal shaft and the internal sleeve.

7 Claims, 8 Drawing Sheets

ACTUATING DEVICE WITH DOUBLE SCREW CONNECTING MEANS

CROSS REFERENCE TO RELATED APPLICATIONS

This is a United States National Stage Application claiming the benefit of International Application Number PCT/EP2014/065514 filed on Jul. 18, 2014 which is incorporated herein by reference in their entireties.

FIELD OF THE INVENTION

The present invention concerns actuating devices able to transform a rotation motion into a translation motion, in particular for use in gate valves; control or regulation valves or choke valves.

BACKGROUND OF THE INVENTION

Valves are used in a variety of industries to control the flow of fluids, in particular in the oil and gas industry. Most valves provide a valve body having a longitudinal flow bore and a transverse gate cavity that intersects the flow bore. Actuating devices are used particularly for moving a closing plate of gate cavity between a closed position, in which the plate obstructed the flow bore, and an open position, in which the plate does not obstruct the flow bore. Actuating devices are driven by an input torque, the necessary torques being generally produced with handwheels or with electro-mechanical wheels.

Actuating devices further provide transmission mechanism able to transform a rotation motion into a translation motion, being provided with a translating shaft that drives the opening and closing of the gate plate and a rotating sleeve connected to the torque wheel.

As it has been observed, the force to apply to the translating shaft of the actuating device is maximum at the valve opening and in a first opening run. Then the force is less important and substantially constant. On the contrary, when the valve has to be closed, the maximum force is to be exerted at the valve final closing. When using a handwheel, it happens that the force is so important at the start of the valve opening and the end of the valve closing that it may require two operators to exert the requested force on the handwheel.

Known actuating devices including double screw connecting means are described in the patent EP-A-1 359 345.

Such actuating devices permit to reduce the necessary torque at the start of the valve opening since the second screw mechanism of higher efficiency is first engaged. The end of the opening run is realized by the first screw mechanism.

However, the start of the valve closing is also realized by the second screw mechanism of higher efficiency being first engaged. The end of the closing run is then realized by the first screw mechanism. The end of the valve closing run requires the maximum of exerted force but, with such an arrangement, it is the screw mechanism with the lowest efficiency that is used.

BRIEF SUMMARY OF THE INVENTION

So, in this particular case, an object of the invention is to reduce the breakaway torque to be produced when opening the valve and the closing torque to be produced when end closing the valve and to increase the speed of the opening and closing stages when the torque to be produce is low important.

So, there is a need to have actuating devices able to induce translating motions exerting variable longitudinal forces and/or with variable speeds.

According to one embodiment, it is proposed an actuating device comprising:

a non-rotating and translating longitudinal shaft, a rotating and translating internal sleeve positioned coaxially to and around the shaft, a rotating and non-translating external sleeve positioned coaxially to the shaft and around the internal sleeve, internal screw connecting means provided between the longitudinal shaft and the internal sleeve, and external screw connecting means provided between the internal sleeve and the external sleeve The internal screw connecting means and the external screw connecting means are adapted to move the longitudinal shaft in the same longitudinal direction when the external sleeve is rotated in the same rotary direction.

The direct efficiency of the internal screw connecting means is higher than the direct efficiency of the external screw connecting means. Terminal abutment means are provided for limiting the longitudinal motion of the internal sleeve with respect to the external sleeve at corresponding terminal longitudinal positions.

Terminal abutment means are provided for limiting the longitudinal motion of the longitudinal shaft with respect to the internal sleeve at corresponding terminal longitudinal positions.

Furthermore, self-releasable coupling means for maintaining a coupling state between the internal sleeve and the longitudinal shaft are provided on one of the terminal abutment means provided for limiting the longitudinal motion of the longitudinal shaft with respect to the internal sleeve, such as the resistant torque induced by the self-releasable coupling means is higher than the driven torque of the external friction screw connecting means.

The internal screw connecting means can be a roller screw mechanism and the external screw connecting means can be a thread friction screw mechanism.

The terminal abutment means can provide rotary abutment means.

The terminal abutment means for limiting the longitudinal motion of the longitudinal shaft with respect to the internal sleeve can provide an annular ring attached to the longitudinal shaft and a ring attached to the internal sleeve, at least one of the rings being provided with self-releasable coupling means.

The self-releasable coupling means can provide a plurality of protruding elements able to engage recesses, respectively carried by the longitudinal shaft and the internal sleeve.

The protruding elements can be balls.

The self-releasable coupling means can provide attractive magnets.

The longitudinal shaft can be connected to a translating closing plate of a knife gate valve.

According to one embodiment, it is also proposed a process for actuating a longitudinal shaft between two end longitudinal positions, in which an internal sleeve is positioned coaxially to and around the shaft, an external sleeve is positioned coaxially to the shaft and around the internal sleeve, internal screw connecting means are provided between the longitudinal shaft and the internal sleeve and external screw connecting means are provided between the internal sleeve and the external sleeve.

The process can provide:
in a forth rotary direction of the external longitudinal sleeve, a first stage during which the rotation of the external sleeve is transmitted to the longitudinal shaft through the internal screw connecting means and a second stage during which the rotation of the external sleeve is transmitted to the shaft through the external screw connecting means, and in a return rotary direction of the external sleeve, a first reverse stage during which the rotation of the external sleeve is transmitted to the shaft through the external screw connecting means and a second reverse stage during which the rotation of the external sleeve is transmitted to the shaft through the internal screw connecting means.

Thanks to the invention, the screw connecting means of higher efficiency is used at the start of valve opening, when the requested force to exert is at maximum, and then the screw connecting means of higher efficiency is used during the rest of the valve opening run when the requested force to exert is reduced and constant.

Another advantage is that the screw connecting means of higher efficiency is used at the end of valve closing, when the requested force to exert is at maximum, and then the screw connecting means of lower efficiency is used during the start of the valve closing run when the requested force to exert is reduced and almost constant.

BRIEF DESCRIPTION OF THE SEVERAL VIEWS OF THE DRAWING

An actuating device according to the present invention will now be described as an example and illustrated on the drawing in which

FIG. 1: a first end position;
FIG. 2: first current forth position;
FIG. 3: forth intermediate position;
FIG. 4: second current forth position;
FIG. 5: second end position;
FIG. 6: first current return position;
FIG. 7: return intermediate position; and
FIG. 8: second current return position.

DETAILED DESCRIPTION OF THE INVENTION

Figure 1:
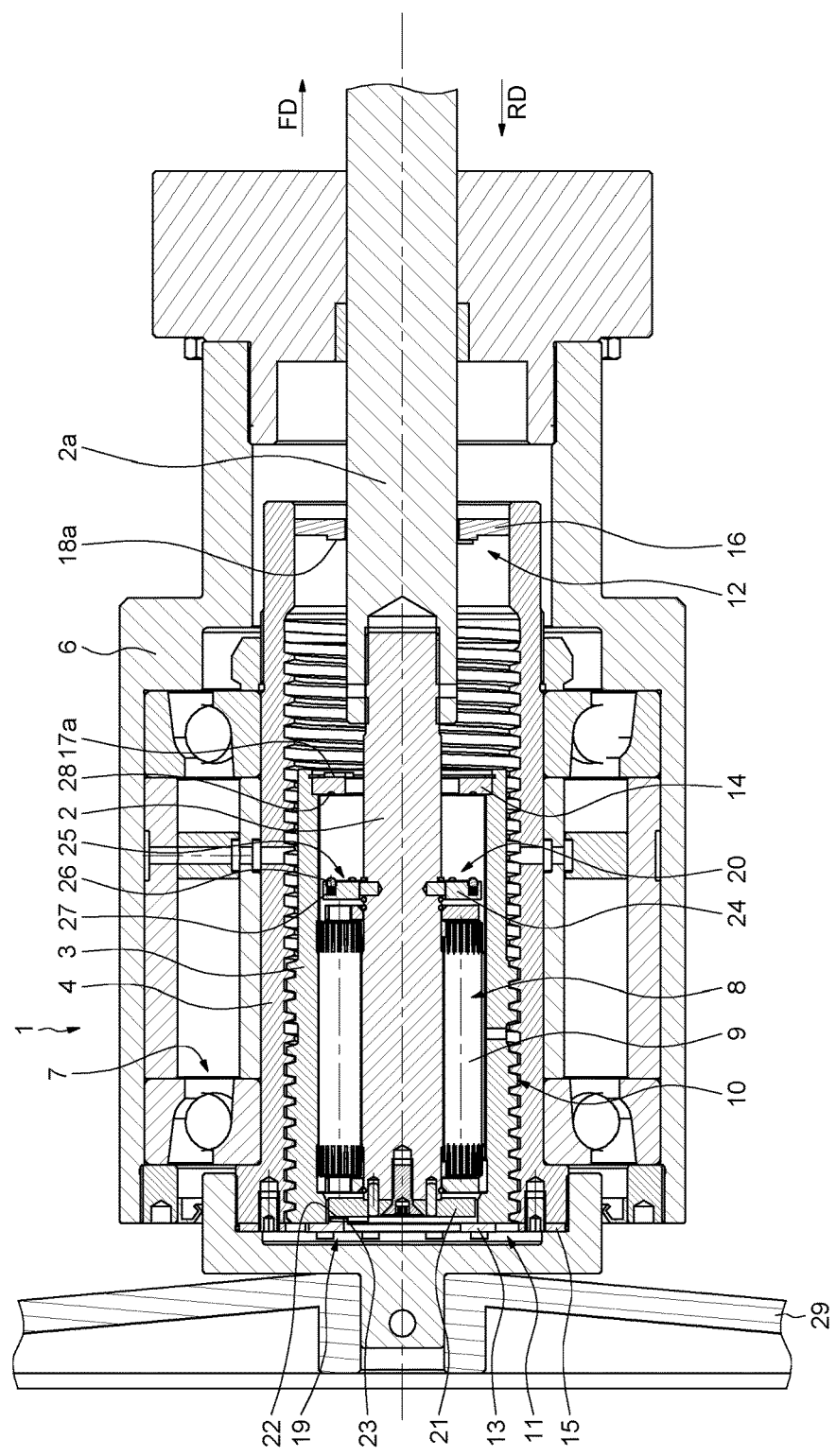
FIGS. 1 to 8 show corresponding longitudinal sections of the actuating device at different longitudinal positions as following.

As illustrated in FIG. 1, an actuating device 1 provides a non-rotary longitudinal shaft 2 to be moved longitudinally, a rotary and translating longitudinal internal sleeve 3 disposed coaxially to and around the longitudinal shaft 2 and a non-translating and rotary longitudinal external sleeve 4 disposed coaxially to and around the internal sleeve 3.

As a reference, the longitudinal shaft 2 extends from left to right in the figures.

The longitudinal shaft 2 is connected to an organ to be moved, such as a rod 2a axially connected to an end of the shaft 2, provided with anti-rotary means (non-illustrated) for preventing rotation of the longitudinal shaft 2, such as longitudinal guiding means. As a reference, the rod 2a is attached to the right end of the shaft 2 in the FIG. 1. The rod 2a can be then connected to a translating closing plate of a knife gate valve (not shown) of a valve so as to control the flow of a fluid.

The external sleeve 4 is supported by a tubular support 6 through a ball bearing system 7 such that the external sleeve 4 cannot move in translation but only in rotation.

Internal screw connecting means 8 are provided between the longitudinal shaft 2 and the internal sleeve 3. For example, the internal screw connecting means 8 is a roller screw mechanism which provides a plurality of longitudinal circulating rollers 9 having respectively a peripheral thread engaged with a peripheral thread of the longitudinal shaft 2 and with an inner thread of the internal sleeve 3, such that a rotation of the internal sleeve 3 induces a longitudinal motion of the longitudinal shaft 2 without a longitudinal motion of the rollers 8 with respect to the shaft 2.

External screw connecting means 10 are provided between the internal sleeve 3 and the external sleeve 4. For example, the external screw connecting means 10 is a friction thread mechanism comprising an external thread of the internal sleeve 3 engaged with an internal thread of the external sleeve 4.

The internal screw connecting means 8 and the external screw connecting means 10 are adapted to move the longitudinal shaft 2 in the same longitudinal direction when the external sleeve 3 is rotated in the same direction.

The direct efficiency of the internal screw connecting means 8 is higher than the direct efficiency of the external screw connecting means 10. This means that, without any other active element, a rotation of the external sleeve 4 is transformed into a translation of the shaft 2 via preferentially the internal screw connecting means 8 and that the internal sleeve 3 and the external sleeve 4 are coupled via the external screw connecting means 10 and turn together. It means also that if the longitudinal shaft 2 and the internal sleeve 3 are coupled, a rotation of the external sleeve 4 is transformed into a translation of the shaft 2 via the external screw connecting means 10.

The longitudinal motion of the internal sleeve 3 relative to the external sleeve 4 is limited by terminal abutment means 11 and 12 active at the end of a predetermined longitudinal stroke of the internal sleeve 3 with respect to the external sleeve 4. As a reference, the terminal abutment means 11 is on a left side of the figure and the terminal abutment means 12 is on the right side of the figure.

The terminal abutment means 11 and 12 provide rings 13 and 14 which are attached to end portion of the internal sleeve 3 and rings 15 and 16 which are attached to the external sleeve 4, which respectively come in contact at the end of the longitudinal stroke of the internal sleeve 3 with respect to the external sleeve 4.

Figure 4:
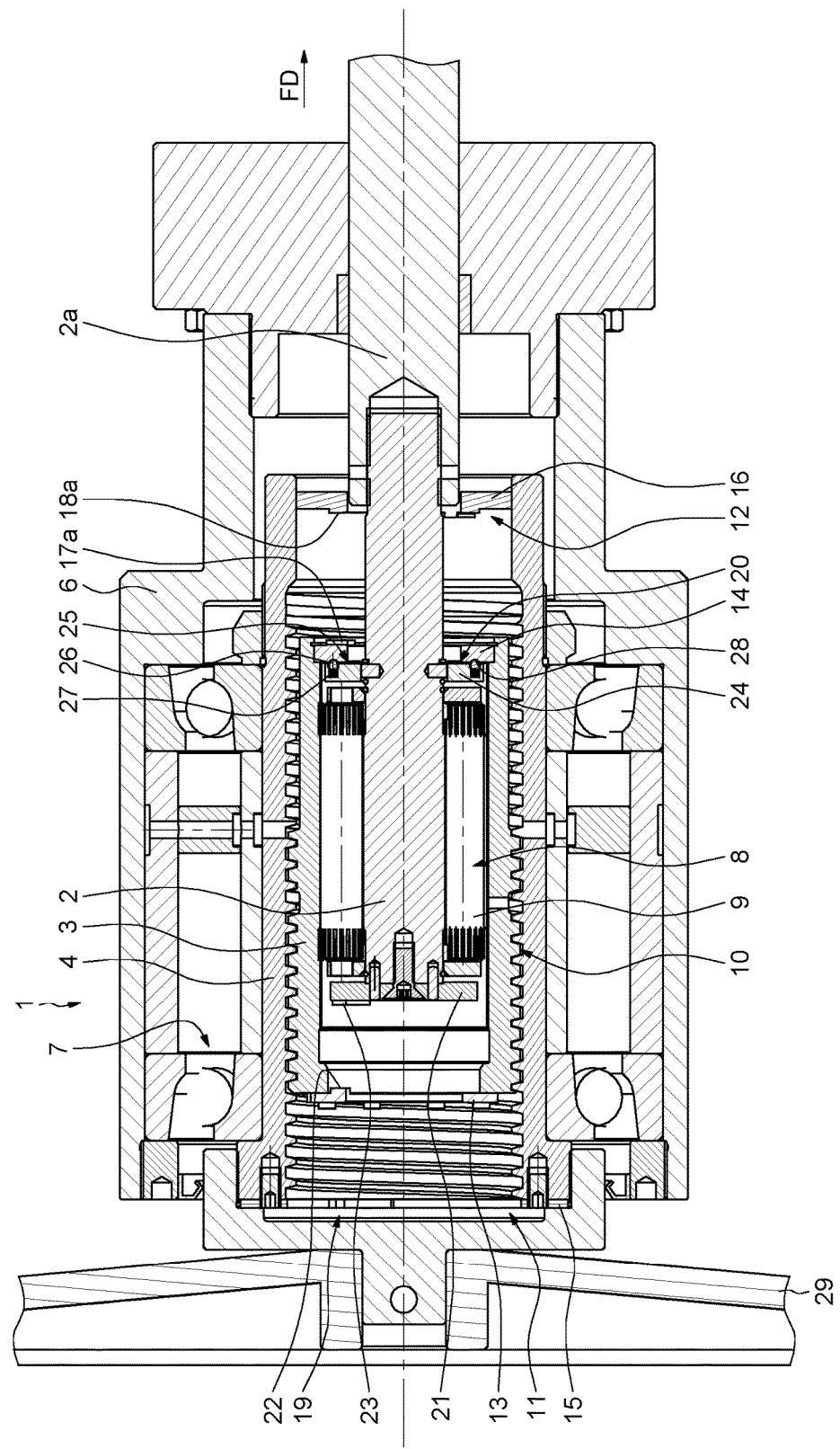

For example, the rings 13 and 15 and the rings 14 and 16 provide respective lugs 17 and 18 (FIG. 4) and lugs 17a and 18a FIG. 1), which form respective rotary abutments and respectively come in circumferential abutments by the effect of the helix thread of the external screw connecting means 10, at the opposite ends of the stroke of the internal sleeve 3 relative to the external sleeve 4.

The longitudinal motion of the longitudinal shaft 2 relative to the internal sleeve 4 is limited by terminal abutment means 19 and 20 active at the end of a predetermined longitudinal stroke of the longitudinal shaft 2 with respect to the internal sleeve 3. As a reference, the terminal abutment means 19 is on a left side of the figure and the terminal abutment means 20 is on the right side of the figure.

The terminal abutment means 18 provides a ring 21 which is attached to the end portion of the longitudinal shaft 2 and the the ring 13 attached to the end of to the internal sleeve 3.

For example, the rings 13 and 21 provide respective lugs 22 and 23 which form rotary abutments and respectively come in circumferential abutments by the effect of the helix thread of the internal screw means 8, at the end of the stroke of the longitudinal shaft relative to the internal sleeve 3.

The terminal abutment means 20 provides an annular ring 24 attached to the longitudinal shaft 2 and the ring 14 attached to the internal sleeve 3.

Furthermore, the ring 14 and 24 are provided of self-releasable coupling means 25 formed as following. The ring 24 is provided of a plurality of balls 26 projected longitudinally towards the ring 14 and of inserted springs 27 acting longitudinally on these balls 24. The balls 24 are distributed on a circumference.

When the ring 24 carried by the longitudinal shaft 2 reaches the ring 14 carried by the internal sleeve 3, by the effect of the helix thread of the internal screw means 8, the balls 26 slide on the radial face of the ring 14 and finally engage in recesses 28 of the ring 14.

The resistant torque induced by the self-releasable coupling means 25 is higher than the driven torque of the external friction screw connecting means 10.

As an alternative not illustrated, the ring 24 may be provided of a plurality of balls projected radially towards the internal sleeve 3 and of inserted springs acting radially on these balls, the balls being distributed on an outer periphery of the ring 24. When the ring 24 carried by the longitudinal shaft 2 reaches the ring 14 carried by the internal sleeve 3, by the effect of the helix thread of the internal screw means 8, the balls slide on an axial inner surface of the internal sleeve 3 and finally engage in recesses of the axial inner surface of the internal sleeve 3 so as to generate a resistant torque.

As another alternative not illustrated, the rings 24 and 14 may be provided of a plurality of associated attractive magnets. When the ring 24 carried by the longitudinal shaft 2 reaches the ring 14 carried by the internal sleeve 3, by the effect of the helix thread of the internal screw means 8, the associated attractive magnets of the rings 24 and 14 cooperate together so as to generate a resistant torque.

The end of the external sleeve 4, opposed to the rod 2a, is provided with a handwheel 29.

We will now describe how the actuating device 1 works.

A first end longitudinal position is illustrated in FIG. 1.

The abutment means 11 operate and the abutment means 19 operate. The internal sleeve 3 is on the left side of the drawing relative to the external sleeve 4.

We consider now that the handwheel 29 is rotated in a forth rotating direction in order to drive the longitudinal shaft 2 in a forth direction FD, from left to right in the drawing.

As the efficiency of the internal screw connecting means 8 is higher than the efficiency of the external screw connecting means 10, the internal sleeve 3 does not move and the rotation of the handwheel 29 is transformed in a translation of the longitudinal shaft 2 through the internal screw connecting means 8. The torque which can be transmitted is high.

Figure 2:
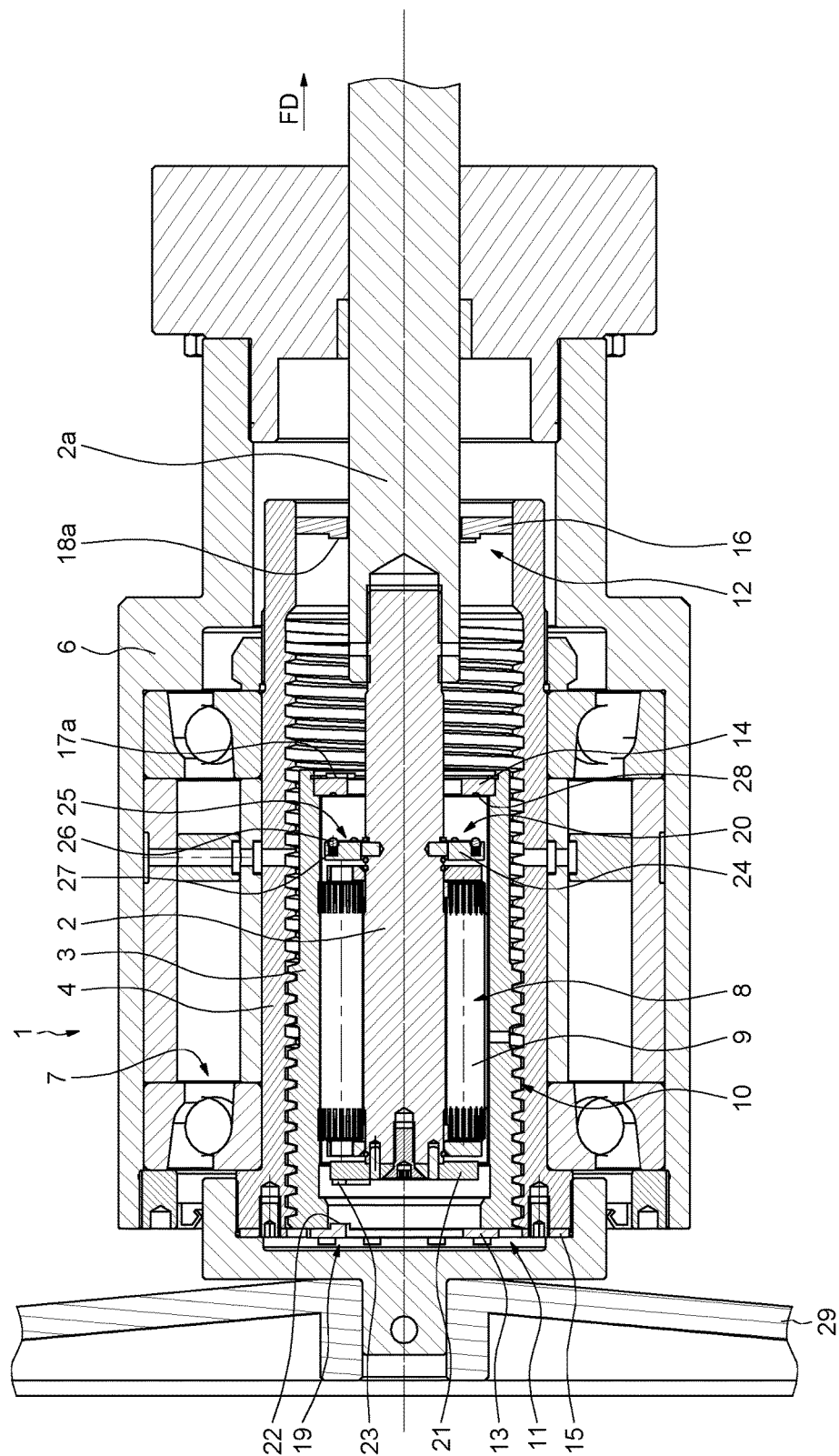

A corresponding current position is illustrated in FIG. 2.

Figure 3:
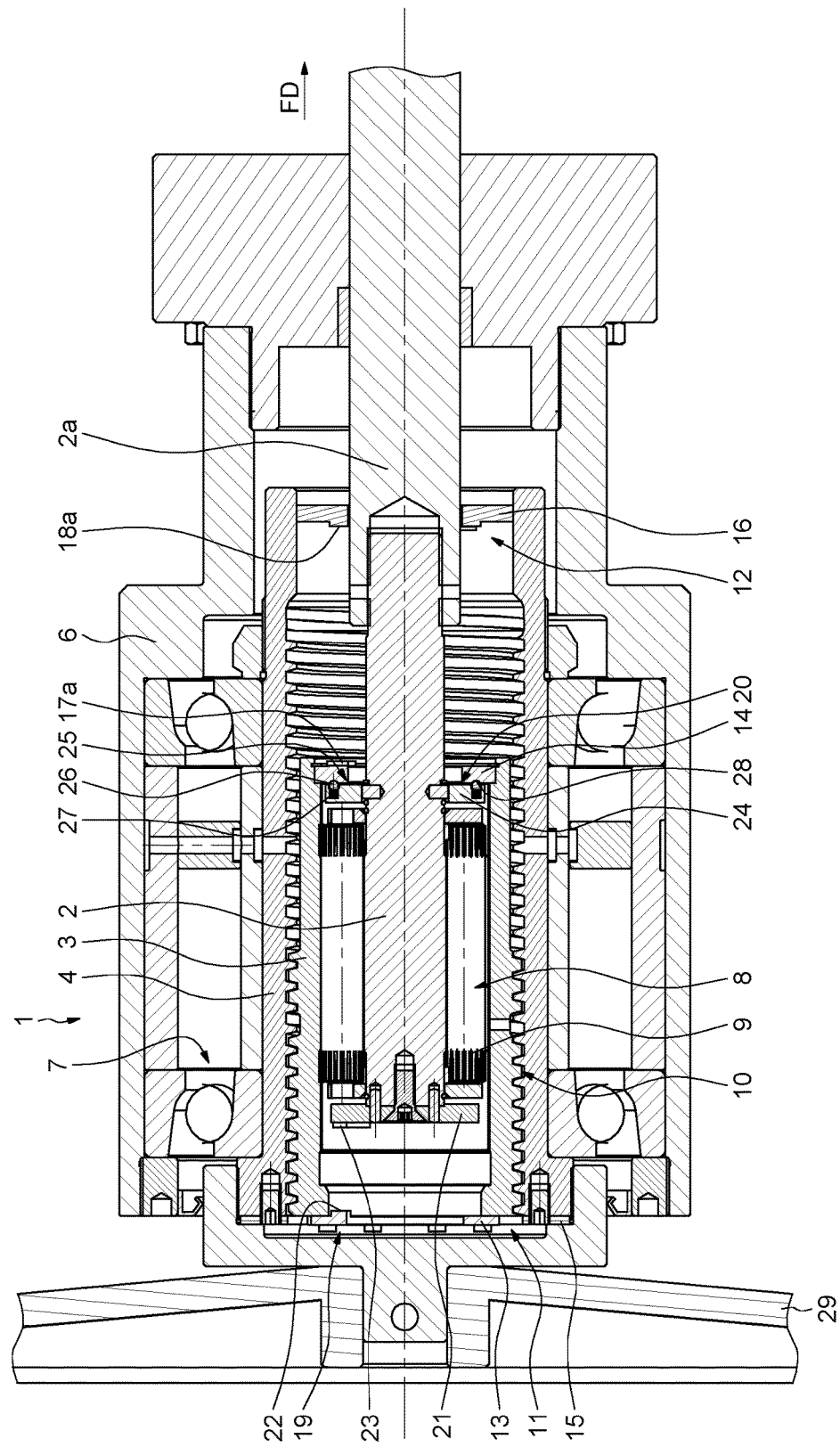

After the forth stroke of the longitudinal shaft 2 relative to the internal sleeve 3 (as a first forth stage) is performed, the abutment means 20 formed by the ring 14 and 24 operate and the self-releasable coupling means 25 operate by engaging the balls 26 in the recesses 28. A corresponding intermediate longitudinal position is reached as illustrated in FIG. 3.

After that, the internal sleeve 3 is coupled to the longitudinal shaft and the external screw connecting means 10 take over and the rotation of the handwheel 29 is transformed in a translation of the longitudinal shaft 2 through the external screw connecting means 10. The torque which can be transmitted is reduced. But, the longitudinal speed of the longitudinal shaft is increased. A corresponding current position is illustrated on FIG. 4.

Figure 5:
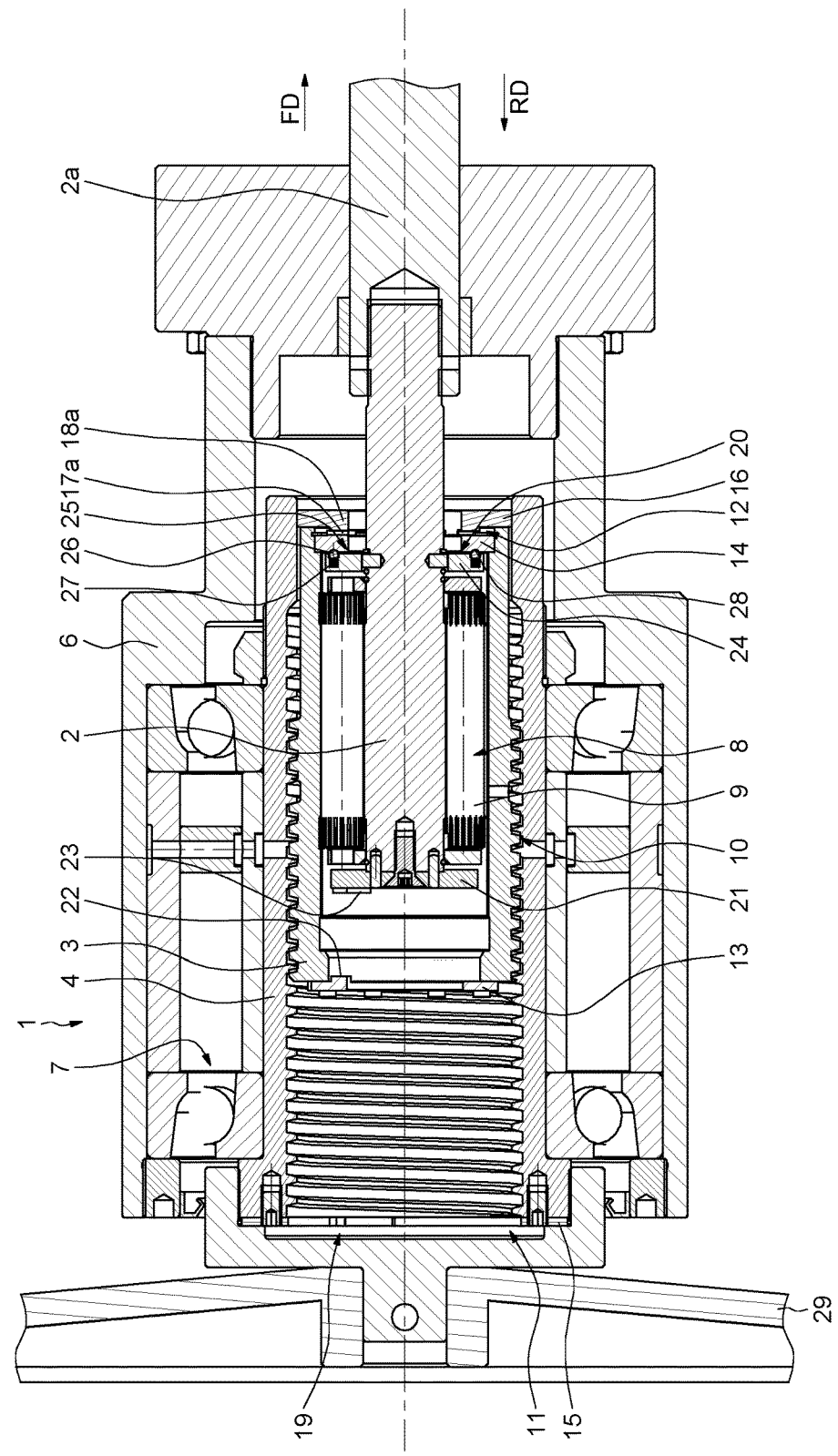

After the forth stroke of the internal sleeve 3 relative to the external sleeve 4 (as a second forth stage) is performed, the abutment means 12 operate. A second end longitudinal position is reached as illustrated in FIG. 5.

We consider now that the handwheel 29 is rotated in a return or reverse rotating direction in order to drive the longitudinal shaft 2 in a return direction RD, from right to left in the drawing.

Because of the existence of the self-releasable coupling means 25 which induce a resistant torque higher than the driven torque of the external friction screw connecting means 10, the internal sleeve 3 stay coupled in rotation with the longitudinal shaft 2 and the return rotation of the handwheel 29 is transformed in a return translation of the longitudinal shaft 2 through the external screw connecting means 8. The blocking torque induced by the self-releasable coupling means 25 is made sufficient to create and maintain this coupling state.

Figure 6:
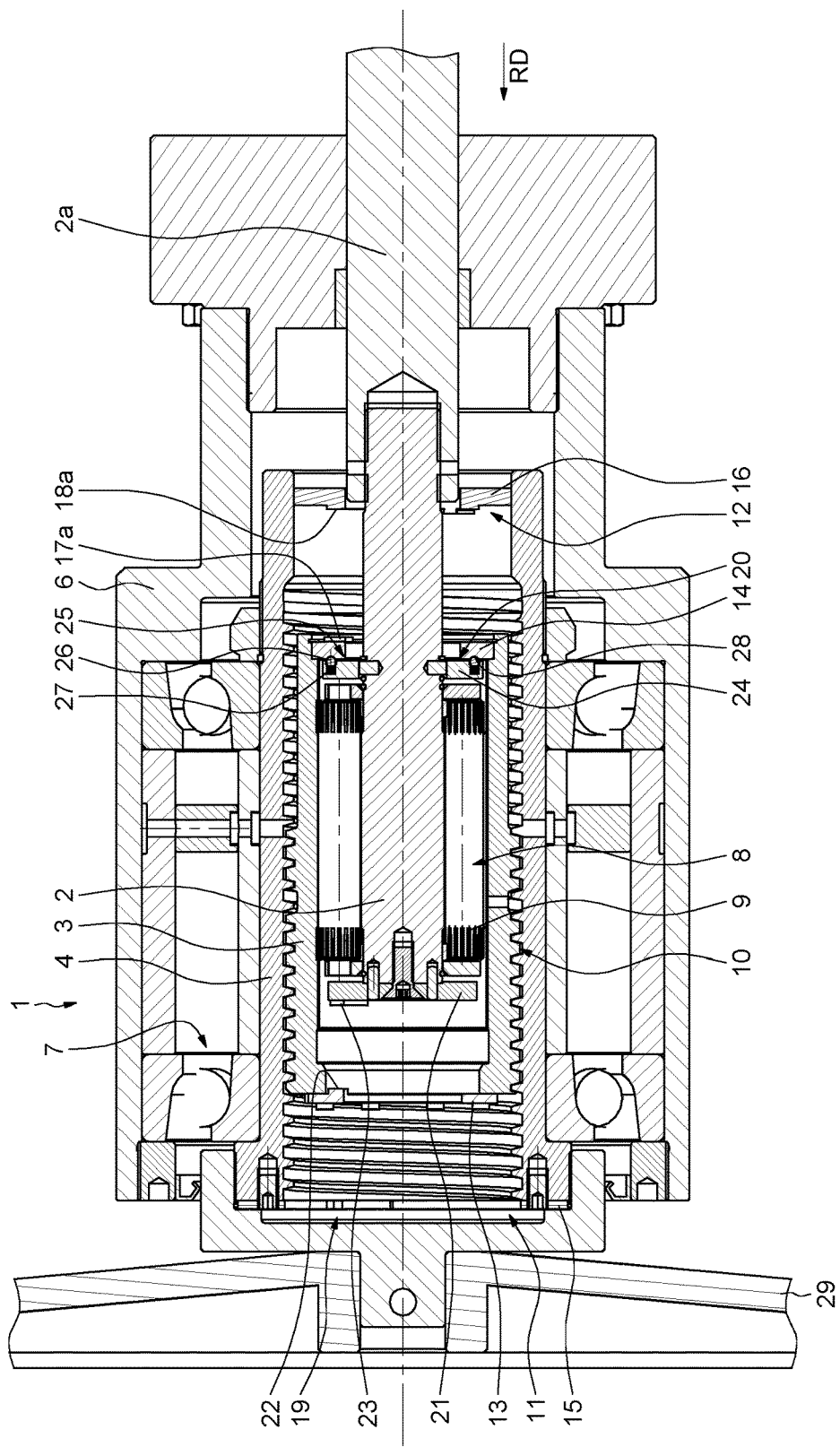

A corresponding current position is illustrated in FIG. 6.

After the return stroke of the longitudinal shaft 2 relative to the internal sleeve 3 (as a first return stage) is performed, the abutment means 19 operate.

Figure 7:
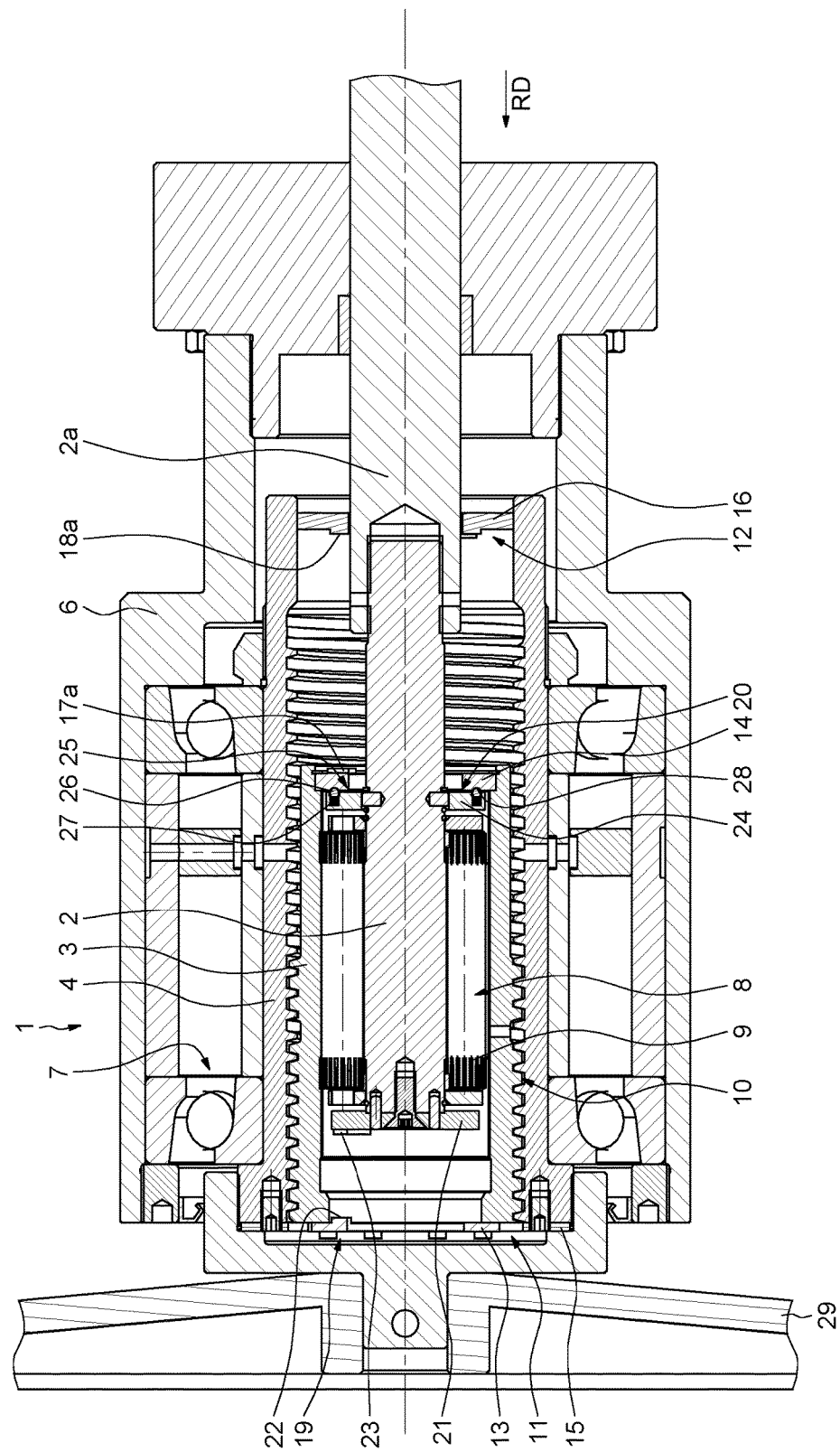

A corresponding intermediate longitudinal position is reached as illustrated in FIG. 7. It can be noted that this position is equivalent to the position illustrated in FIG. 3.

After that, the internal screw connecting means 8 take over and the rotation of the handwheel 29 is transformed into a translation of the longitudinal shaft 2 through the internal screw connecting means 10. It occurs an unblocking or releasing of the self-releasable coupling means 25 by rotation inducing a disengagement of the balls 26 out of the recesses.

Figure 8:
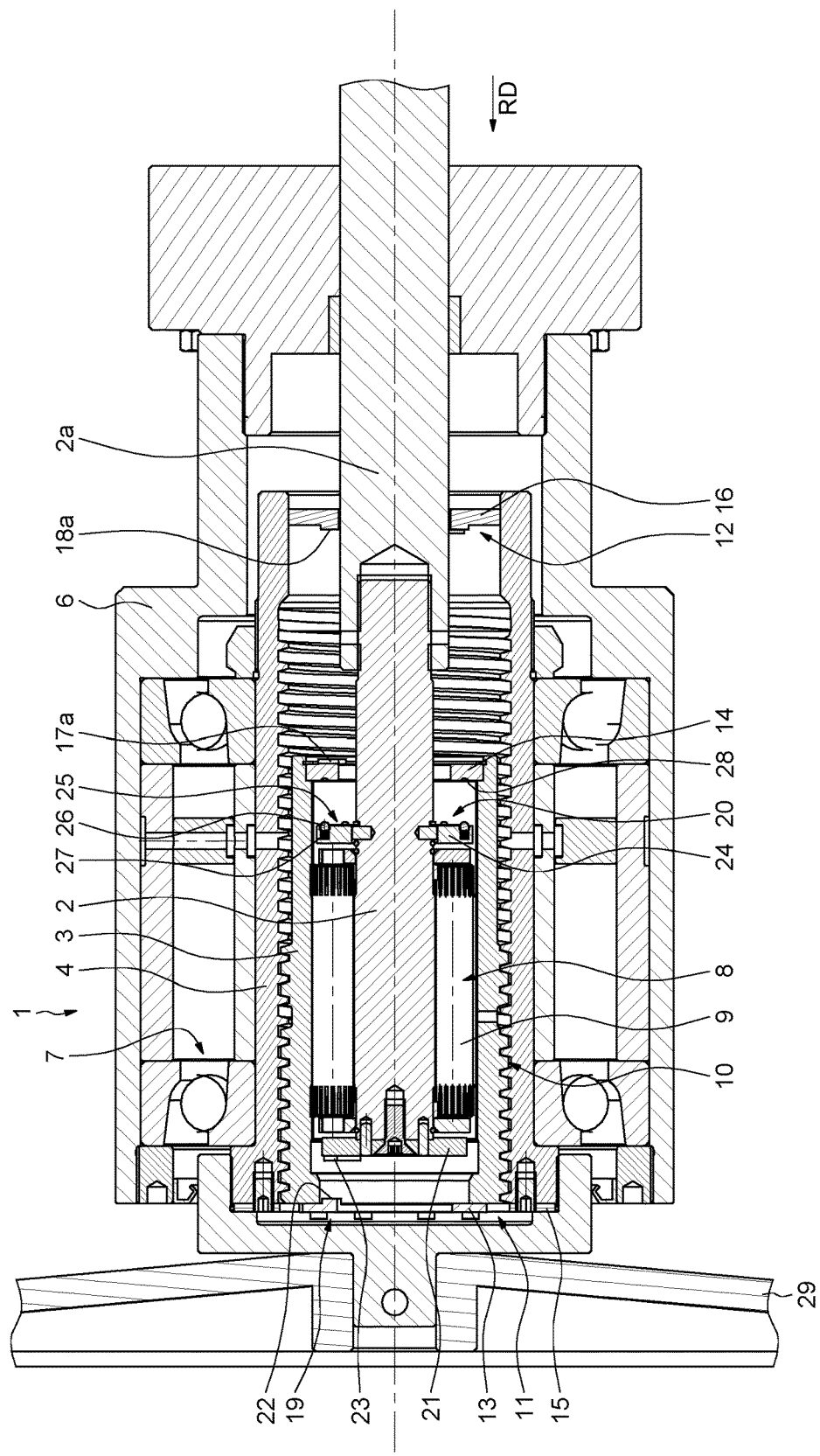

A corresponding current position is illustrated in FIG. 8.

After the return stroke of the internal sleeve 3 relative to the external sleeve 4 (as a second return stage) is performed, the abutment means 11 operate. The first end position illustrated in FIG. 1 is recovered.

As an example, the rod 2a can be connected to the opening/closing plate of a knife gate valve. In this type of valve, the opening motion presents a first opening phase during which the resistance to opening is high and a second opening phase during which the resistance to opening becomes smaller. The closing motion presents a first closing phase during which the resistance to opening is small and a second closing phase during which the resistance to closing becomes higher.

Hence, when the actuating device is at the the first end position (FIG. 1), the knife gate valve is completely closed, and, when the actuating device is at the the second end position (FIG. 5), the knife gate valve is completely opened.

The consequences are the following.

The the first forth stage of the actuating device 1, during which the torque able to be transmitted from the handwheel 29 to the longitudinal shaft 2 through the internal screw connecting means 8 is high, corresponds to the first opening phase of the valve, with a small speed of translation.

The second forth stage of the actuating device 1, during which the torque able to be transmitted from the handwheel 29 to the longitudinal shaft 2 through the external screw connecting means 10 is small, corresponds to the second opening phase of the valve, with a high speed of translation.

The first return stage of the actuating device 1, during which the torque able to be transmitted from the handwheel 29 to the longitudinal shaft 2 through the external screw connecting means 10 is small, corresponds to the second closing phase of the valve, with a high speed of translation.

The the second return stage of the actuating device 1, during which the torque able to be transmitted from the handwheel 29 to the longitudinal shaft 2 through the internal screw connecting means 8 is high, corresponds to the second closing phase of the valve, with a small speed of translation.

According to another embodiment, the self-releasing means 20 could be formed with elements other than the lugs 17 and 18. As an example, the ring 16 and 24 could carry magnets attractive when the last are close in order to create the the blocking torque between the longitudinal shaft 2 and the internal sleeve 3. As another example, the balls 26 could act radially and cooperate with longitudinal grooves and ribs of the internal sleeve 3.

In another embodiment, the handwheel could be replaced by an electro-mechanical wheel. In this case, the actuating device such as described could permit to reduce the necessary power of this electro-mechanical wheel.

Although the present invention has been illustrated using an inverted roller screw mechanism and a friction screw mechanism as double screw connecting means, it will be understood that the invention can be applied without major modification to actuating devices using any other types and combination of screw mechanism, such as planetary roller screw mechanism, ball screw mechanism, friction screw mechanism.

Moreover, although the present invention has been illustrated using a plurality of ball bearing systems, it will be understood that the invention can be applied without major modification to bearings using rolling elements that are not balls and/or that have several rows of rolling elements.

The invention can be used with any type of valves, for instance gate valves, control or regulation valves or choke valves. The actuating device may be used for instance with a surface gate or a subsea valve gate which may be actuated by a remote operating vehicle or an actuator.

Moreover, the different longitudinal speeds able to be induced by actuation of the first screw connecting means and the screw connecting means, successively, can be implemented in other examples of applications, particularly when there is a need to have a fast approach strokes and then a slow and precise positioning. So, the actuating device of the invention can be applied for displacing organs of robots or machines, tools, controlled chirurgical tools, laser cuttings, welding means, molding means, pendulums.

The embodiments disclosed in the description may be arranged or combined together and are still within the meaning of the present invention.

The invention claimed is:

1. An actuating device comprising:
a non-rotating and translating longitudinal shaft,
a rotating and translating internal sleeve positioned coaxially to and around the shaft,
a rotating and non-translating external sleeve positioned coaxially to the shaft and around said internal sleeve,
internal screw connecting means provided between the longitudinal shaft and the internal sleeve,
external screw connecting means provided between the internal sleeve and the external sleeve, wherein
the internal screw connecting means and the external screw connecting means are adapted to move the longitudinal shaft in the same longitudinal direction when the external sleeve is rotated in the same rotary direction; wherein
the direct efficiency of the internal screw connecting means is higher than the direct efficiency of the external screw connecting means; and wherein
terminal abutment means are provided for limiting the longitudinal motion of the internal sleeve with respect to the external sleeve at corresponding terminal longitudinal positions;
second terminal abutment means are provided for limiting the longitudinal motion of the longitudinal shaft with respect to the internal sleeve at corresponding terminal longitudinal positions; and
self-releasable coupling means for maintaining a coupling state between the internal sleeve and the longitudinal shaft are provided on one of the terminal abutment means provided for limiting the longitudinal motion of the longitudinal shaft with respect to the internal sleeve, such that the resistant torque induced by the self-releasable coupling means is higher than the driven torque of the external friction screw connecting means.

2. The actuating device according to claim 1, wherein the internal screw connecting means is a roller screw mechanism and the external screw connecting means is a thread friction screw mechanism.

3. The actuating device according to claim 1, wherein the terminal abutment means comprise rotary abutment means.

4. The actuating device according to claim 1, wherein the terminal abutment means for limiting the longitudinal motion of the longitudinal shaft with respect to the internal sleeve comprises an annular ring attached to the longitudinal shaft and a ring attached to the internal sleeve, at least one of the rings being provided with the self-releasable coupling means.

5. The actuating device according to claim 1, wherein the self-releasable coupling means comprise a plurality of protruding elements able to engage recesses, respectively carried by the longitudinal shaft and the internal sleeve.

6. The actuating device according to claim 5 wherein the protruding elements are balls.

7. The actuating device according to claim 1, wherein the self-releasable coupling means comprise attractive magnets.

* * * * *